(12) United States Patent
Murata (10) Patent No.: US 7,673,663 B2
(45) Date of Patent: Mar. 9, 2010

(54) PNEUMATIC TIRE WITH TREAD HAVING NON-LINEAR RIB

(75) Inventor: Takehiko Murata, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 900 days.

(21) Appl. No.: 11/414,299

(22) Filed: May 1, 2006

(65) Prior Publication Data
US 2007/0000590 A1 Jan. 4, 2007

(30) Foreign Application Priority Data
Jun. 30, 2005 (JP) ............... 2005-192409

(51) Int. Cl.
*B60C 11/03* (2006.01)
*B60C 11/13* (2006.01)
(52) U.S. Cl. ............... 152/209.8; 152/209.15; 152/209.22
(58) Field of Classification Search ............... 152/209.8, 152/209.9, 209.15, 209.22
See application file for complete search history.

(56) References Cited

U.S. PATENT DOCUMENTS

| | | | | |
|---|---|---|---|---|
| 3,162,229 A | * | 12/1964 | Ellenrieder et al. | 152/209.8 |
| 3,405,753 A | * | 10/1968 | Verdier | 152/209.9 |
| 3,410,329 A | * | 11/1968 | Bezbatchenko, Jr. | 152/209.8 |
| 5,054,530 A | * | 10/1991 | Shiraishi | 152/209.8 |
| 5,361,814 A | * | 11/1994 | Covert et al. | 152/209.8 |
| 5,735,979 A | * | 4/1998 | Secondari | 152/209.8 |
| 7,484,543 B2 | * | 2/2009 | Colombo et al. | 152/209.8 |
| 2005/0257870 A1 | * | 11/2005 | Ohsawa et al. | 152/209.9 |
| 2006/0032567 A1 | * | 2/2006 | Oh | 152/209.18 |

FOREIGN PATENT DOCUMENTS

| | | | |
|---|---|---|---|
| EP | 687582 | * | 12/1995 |
| GB | 1549347 | * | 8/1979 |
| JP | 06-183208 | * | 7/1994 |
| JP | 8-164714 A | | 6/1996 |
| JP | 8-197912 A | | 8/1996 |
| JP | 11-208217 | * | 8/1999 |
| JP | 2001-071713 | * | 3/2001 |

\* cited by examiner

*Primary Examiner*—Steven D Maki
(74) *Attorney, Agent, or Firm*—Birch, Stewart, Kolasch & Birch LLP (57) ABSTRACT

A pneumatic tire comprises a tread portion provided with a nonlinear rib having an amplitude having a center in the tire axial direction. In a normally loaded condition of the tire, the tread portion has an outside tread edge and an inside tread edge when the camber angle of the tire is 0 degrees. In the normally loaded condition, when the a camber angle of 4 degrees is given to the tire to inline towards the outside tread edge, a foot print shape of the tire has a maximum circumferential length at an axial position MC which is off the tire equator towards the outside tread edge. The nonlinear rib is positioned off the tire equator towards the outside tread edge such that the axial position MC lies within the amplitude of the nonlinear rib, and one of the edges of the nonlinear rib on the outside tread edge side is chamfered.

5 Claims, 8 Drawing Sheets

PNEUMATIC TIRE WITH TREAD HAVING NON-LINEAR RIB

The present invention relates to a pneumatic tire, more particularly to an improved tread portion capable of improving cornering performance.

In general, pneumatic tires for passenger cars, sport utility vehicles, sport cars and the like are provided with tread grooves, and sometimes a straight rib defined between two circumferential grooves is provided in the tread portion. For example, Japanese patent application publication JP-A-8-164714 discloses a pneumatic tire of which tread portion is provided on only one side of the tire equator with two straight circumferential grooves. As a result, a single straight rib is formed on only one side of the tire equator. Japanese patent application publication JP-A-8-197912 also discloses a pneumatic tire having a tread portion provided on only one side of the tire equator with straight ribs.

When a pneumatic tire having a straight rib one side of the tire equator is used in very severe high-speed running conditions such as circuit racing, if the straight rib is located on the outside of the turn during cornering, the rib receives a very large side force from the road surface, and accordingly the rib is liable to deform leaning towards the inside of the turn, which results in a remarkable decrease in the ground contacting area of the rib. Therefore, cornering performance, e.g. cornering traction, grip and the like is deteriorated. Further, if the outside part of the tread on the outside of the straight rib is divided into small tread elements, by lateral drain grooves, the outside part wears rapidly, and high-speed durability of the tire greatly decreases.

It is therefore, an object of the present invention to provide a pneumatic tire, in which a rib provided with a nonlinear configuration is disposed off the tire equator to ensure a sufficient ground contacting area of the rib during cornering and thereby cornering performance, e.g. cornering traction can be improved.

According to the present invention, a pneumatic tire comprises a tread portion provided with a nonlinear rib having an amplitude having a center in the tire axial direction, wherein
the amplitude has a center in the tire axial direction,
in a normally loaded condition of the tire, the tread portion has an outside tread edge and an inside tread edge when the camber angle of the tire is 0 degrees,
in the above-mentioned normally loaded condition, when the a camber angle of 4 degrees is given to the tire to incline towards the outside tread edge, a foot print shape of the tire has a maximum circumferential length at an axial position MC which is off the tire equator towards the outside tread edge,
the above-mentioned nonlinear rib is positioned off the tire equator towards the outside tread edge such that the axial position MC lies within the amplitude range of the nonlinear rib, and
one of the edges of the nonlinear rib on the outside tread edge side is chamfered.

Preferably, the center of the amplitude of the nonlinear rib is positioned in the vicinity of the axial position MC.

Embodiments of the present invention will now be described in detail in conjunction with the accompanying drawings.

A pneumatic tire comprises a tread portion with the tread edges, a pair of axially spaced bead portions, and a pair of sidewall portions extending between the tread edges (Eo and Ei) and bead portions so that the tire has a troidal shape usually, to reinforce the tire, a carcass comprising at least one ply of cords, a tread reinforcing belt, a pair of bead cores and the like are provided as well known in the tire art.

Figure 1:
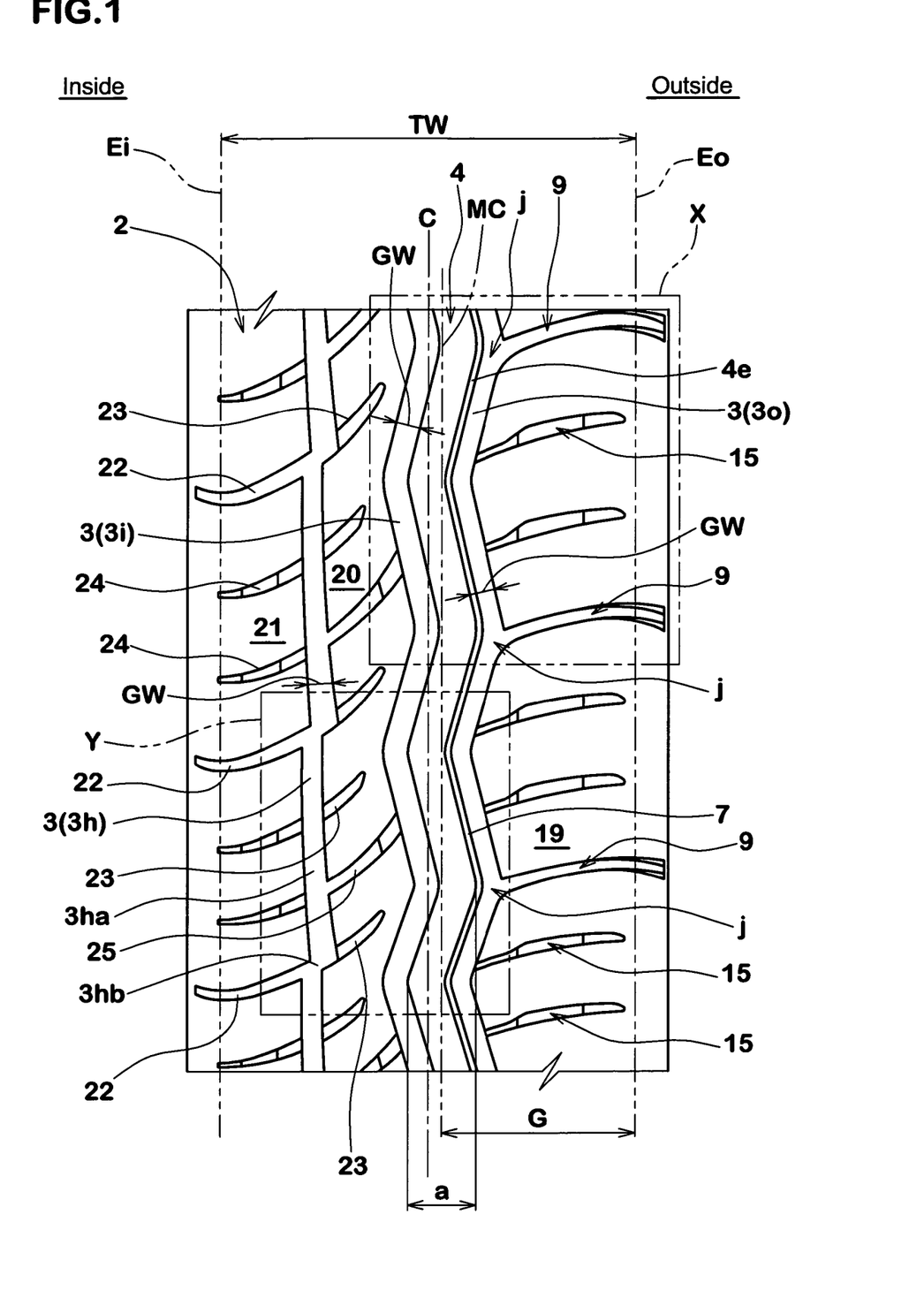
FIG. 1 is a developed view of the tread portion of a pneumatic tire according to the present invention showing a tread pattern.
Figure 2:
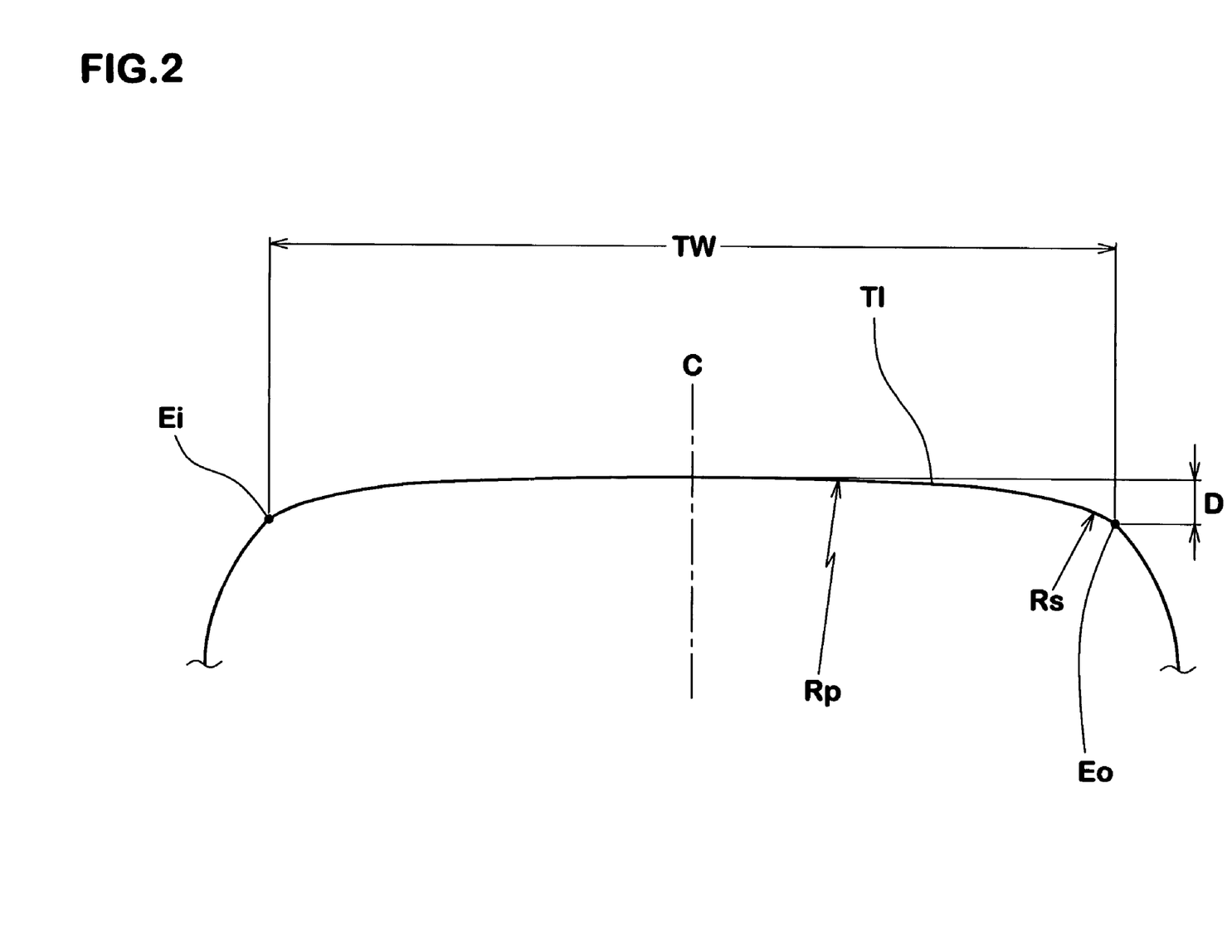
FIG. 2 shows a tread profile therefor.

A pneumatic tire 1 according to the present invention is provided in the tread portion 2 with tread grooves defining a tread pattern, and the tread portion 2 is provided with a round-shoulder profile Tl. An example of the tread profile Tl and an example of the tread pattern are shown in FIGS. 1 and 2.

The tread pattern according to the present invention is asymmetrical about the tire equator C, and in relation to the vehicle, the positions of the tire sidewall portions are fixed. In other words, the tire has to be mounted on a wheel rim such that a tread edge Eo (hereinafter, the "outside tread edge Eo") becomes outboard of the vehicle, and accordingly the other tread edge Ei (hereinafter, the "inside tread edge Ei") becomes inboard. Therefore, the tire may be provided on the surface of the sidewall portion for example, with an indication of whether outboard or inboard of the vehicle.

DEFINITIONS and Outside

The inside tread edge Ei refers to one of the two tread edges which is intended to be positioned towards the center of the vehicle body. The outside tread edge Eo refers to the other tread edge which is intended to be positioned away from the center of the vehicle body.

According thereto, in this specification, the expressions "axially outside (or simply outside)" and "axially inside (or simply inside)" are used toward the outside tread edge Eo and inside tread edge Ei, respectively, to refer relative positions with respect to the tire axial direction.

Tread Edges Ei and Eo

The axial outermost edges of the ground contacting region which occurs under the normally loaded condition when the camber angle of the tire is zero.

Tread Width TW

The width measured under the normally inflated unloaded condition, as the axial distance between the tread edges Ei and Eo determined as above.

Virtual Cornering Condition

Figure 10:
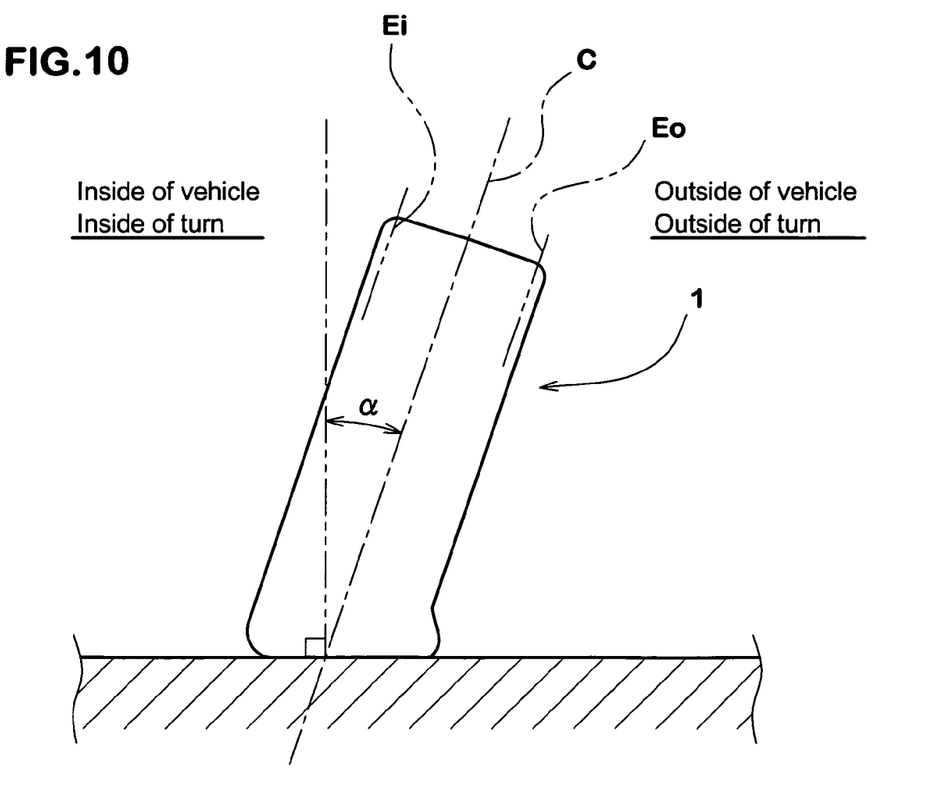
FIG. 10 is a diagram for explaining a virtual cornering condition used to evaluate the foot print during cornering.

The normally loaded condition of the tire which is inclined at a camber angle (alpha) of 4 degrees as shown in FIG. 10.

Normally Inflated Unloaded Condition

A condition such that the tire is mounted on a standard wheel rim and inflate to a standard pressure but loaded with no tire load.

Normally Loaded Condition

A condition such that the tire is mounted on a standard wheel rim and inflate to a standard pressure and loaded with a standard tire load.

Standard Wheel Rim

A wheel rim, with which the tire is intended to be used, usually officially approved for the tire by standard organization, i.e. JATMA (Japan and Asia), T&RA (North America), ETRTO (Europe), STRO (Scandinavia) and the like.

For example, the standard wheel rim is the "standard rim" specified in JATMA, the "Measuring Rim" in ETRTO, the "Design Rim" in TRA or the like.

Standard Pressure and Tire Load

The standard pressure and the standard tire load are the maximum air pressure and the maximum tire load for the tire specified by the same organization in the Air-pressure/Maximum-load Table or similar list. For example, the standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In the case of passenger car tires, however, the standard pressure and standard tire load are uniformly defined by 180 kPa and 88% of the maximum tire load, respectively.

Tread Element

An independent part of the tread portion 2 of which top face is intended to contact with the road surface.

Rib

A tread element substantially continuous in the tire circumferential direction. The expression "substantially continuous" means that there is no groove having a width of more than 1 mm and extending across the entire width of the rib.

A sipe having a width of less than 1 mm and a notch terminates in the rib may be provided.

Nonlinear Groove

This means a zigzag groove and a wavy groove, namely, a groove having a series of sharp turns or a series of curves.

The present invention is suitably applied to a radial tire for passenger cars especially sport cars.

The example shows in FIG. 1 is a tread pattern suitable for low-aspect-ratio radial tires for sport cars.

According to the present invention the tread portion 2 is provided with two circumferential grooves 3$i$ and 3$o$ to define a rib 4 therebetween. In this embodiment, as shown in FIG. 1, an additional circumferential groove 3$h$ is provided on the axially inside of the axially inside circumferential grooves 3$i$. Further, the tread portion 2 is provided with lateral grooves extending from the circumferential grooves 3. All the circumferential grooves 3$o$, 3$i$ and 3$h$ are nonlinear grooves. Accordingly, the rib 4 defined between the axially outside nonlinear groove 3$o$ and inside nonlinear groove 3$i$ is a nonlinear rib having an amplitude (a).

The rib 4 has a top face 4T to contact with the road surface, a side wall 4So on the outside tread edge (Eo) side, and a side wall 4Si on the inside tread edge (Ei) side.

The amplitude (a) is the peak-to-peak amplitude measured in the tire axial direction, more specifically, the axial distance measured at the top of the rib between the extreme ends 4$o$ (zigzag peaks or zeniths) on the outside tread edge (Eo) side, and the extreme ends 4$i$ (zigzag peaks or zeniths) on the inside tread edge (Ei) side.

The width RW of the rib 4 measured perpendicularly to the center line of the rib is preferably set in a range of not less than 8%, more preferably more than 9%, but not more than 13%, more preferably less than 11% of the tread width TW.

The amplitude (a) is naturally more than the width RW, and preferably set in a range of not less than 12%, more preferably more than 14%, but not more than 20%, more preferably less than 18% of the tread width TW.

The rib 4 is therefore, increased in the lateral stiffness (rigidity) and as a result the deformation during cornering can be effectively decreased, and the top face of the rib 4 can be stably contact with the road surfaces during cornering. Further, the zigzag configuration disperses stress due to side force during cornering, and as a result, the occurrence of uneven wear can be also controlled.

In this embodiment, in order to further increase the lateral stiffness, the rib 4 is not provided with any groove inclusive of sipe, cut, slot and the like.

According to the present invention, the axial position of the rib 4 is not centered on the tire equator C.

During cornering or turn, in the tire on the outside of the turn, the outside tread edge Eo gets pushed down toward the road and the inside tread edge Ei on the inside of the turn rises up due to the centrifugal force. As a result, the ground contacting area increases on the outside of the tire equator C, but decreased on the inside of the tire equator C.

Figure 3:
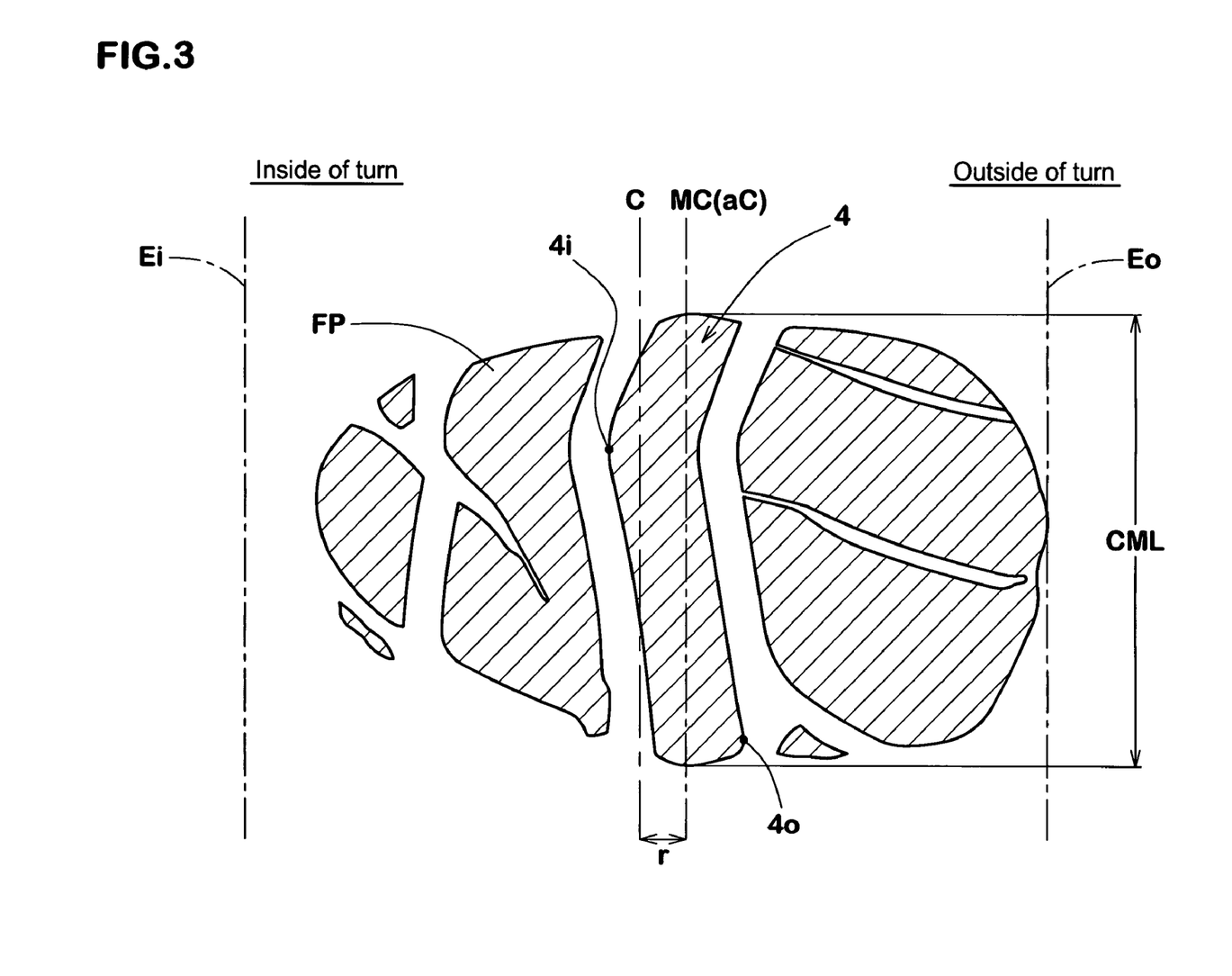
FIG. 3 shows an example of the foot print of the tire during cornering.

FIG. 3 shows an example of the foot print FP during cornering, of the tire 1 located on the outside of the turn.

The foot print FP somewhat varies depending on the circumferential position in the tread pattern because the relative positions of the tread grooves included in the foot print are varied depending on the circumferential position. But, the outline shape or the average shape of the foot prints FP has a maximum circumferential length CML at a certain axial position MC (hereinafter, the "maximum tread length position MC") which is off the tire equator C towards the outside tread edge Eo, and the outline shape becomes oval like a hen-apple.

If the nonlinear rib 4 is disposed at the maximum tread length position MC, a maximum cornering traction may be derived from the tread pattern. Therefore, the rib 4 is located such that the position MC is included in the range of the above-mentioned amplitude (a) of the rib 4.

Preferably, the axial distance of the center (aC) of the amplitude (a) from the position MC, namely, the offset (r) is set in a range of not more than 40%, more preferably less than 30%, still more preferably less than 10% of the magnitude of the amplitude (a). It is especially preferable that the center (aC) is aligned with the position MC.

The above-mentioned top face 4T of the rib 4 is smooth, and in the tire meridian section the top face 4T is flat.

In this embodiment, the side walls 4So and 4Si of the rib 4 are parallel with each other when viewed from the radially outside as shown in FIG. 1. In other words, the side walls 4So and 4Si are provided with the same configurations, but it is also possible to provide different configurations. In this example, accordingly, the rib width RW is substantially constant along the entire length of the rib 4.

Each of the configurations of the side walls 4So and 4Si is zigzag or wavy having pitch lengths Pa and an amplitude Za.

As the side walls 4So and 4Si are defined by the outside and inside nonlinear grooves 3$o$ and 3$i$, respectively, the pitch lengths Pa and amplitude Za are described hereunder in conjunction with the nonlinear grooves 3$o$ and 3$i$.

The outside and inside main nonlinear grooves 3$o$ and 3$i$ are a zigzag or wavy groove of which widthwise center line has the zigzag pitch lengths Pa and zigzag amplitude Za (peak-to-peak).

If the circumferential pitch lengths Pa are too large, and/or the amplitude Za is too small, then it becomes difficult to increase the lateral stiffness (rigidity) of the rib 4, and the deformation during cornering tends to increase.

If the pitch lengths Pa are too small and/or the amplitude Za is too large, then, as the nonlinear grooves 3i and 3o are increased in the resistance to water flow, wet performance tends to decrease, and further, uneven wear is liable to occur at the ends 4o and 4i.

Thus, the number of the pitches per groove (or side wall) is preferably limited within a range of not less than 12, preferably not less than 14, but not more than 19, preferably not more than 17.

The amplitude Za is set in a range of not less than 12%, preferably more than 14%, but not more than 20%, preferably less than 18%, of the tread width TW.

Preferably, the ratio (Za/Pa) of the amplitude Za to each pitch length Pa is set in a range of not less than 0.08, more preferably not less than 0.10, but not more than 0.14, more preferably not more than 0.12.

In the case of passenger car tire sizes, the circumferential pitch lengths Pa may be set in a range of not less than 90 mm, but not more than 160 mm.

The main role of the nonlinear circumferential groove 3 (3o, 3i, 3h) is to discharge water between the tread portion and the road surface. If the groove width too wide, however, there is a tendency for the steering stability to deteriorate. If too narrow, wet performance is deteriorated. Therefore, the groove width GW is preferably set in a range of not more than 8%, more preferably less than 7% of the tread width TW, but not less than 4%, more preferably more than 5% of the tread width TW.

The grooves 3o, 3i and 3h can be the same groove width GW. But, in order to increase the rigidity of the outside part of the tread portion 2 which part receives a larger side force during cornering, the outside groove 3o may be formed with a narrower width than the inside groove 3i as far as the above limitation is satisfied.

As to the depth GD of the nonlinear circumferential groove 3, on the other hand, if too deep, in severe high-speed running conditions such as circuit racing, as the heat generation from the tread rubber increases and the tread rubber is liable to cause tread melting and the durability is rapidly and greatly decreased. If the groove depth is too small, on the other hand, wet performance decreases.

Therefore, the depth GD of the nonlinear circumferential groove 3 is preferably set in a range of not less than 6 mm, but not more than 10 mm, more preferably less more than 8 mm.

To facilitate the formation of the above-mentioned foot print shape, the tread profile Tl and the axial positions of the nonlinear circumferential grooves 3o and 3i are limited as follows in addition to the above limitation of the groove width GW.

The outside main nonlinear groove 3o is positioned such that the axial distance from the outside tread edge Eo to the center of the zigzag center line of the groove 3o (namely, the center of the amplitude) is in a range of from 32 to 46% of the tread width TW.

The inside main nonlinear groove 3i is positioned such that the axial distance from the outside tread edge Eo to the center of the zigzag center line of the groove 3i (namely, the center of the amplitude) is in a range of from 47 to 63% of the tread width TW.

Further, the inside secondary nonlinear groove 3h is positioned such that the axial distance from the outside tread edge Eo to the center of the zigzag center line of the groove 3h is in a range of from 70 to 82% of the tread width TW.

The outside and inside main nonlinear circumferential grooves 3o and 3i are each composed of substantially straight segments of the substantially same lengths, and the corners are rounded to prevent uneven wear and crack starting therefrom. Here, the substantially same lengths means that the lengths are allowed to have small variations due to so called "variable pitching method" which is well known in art and usually employed in order to reduce tire noise during running.

In this embodiment, with respect to the zigzag pitches Pa and zigzag amplitude Za, the outside nonlinear groove 3o is the substantially same as the inside main nonlinear groove 3i. Further, with respect to the circumferential arrangement of the two grooves 3i and 3o, the zigzags of the groove center lines thereof are in phase in the tire circumferential direction. The inside and outside nonlinear grooves 3i and 3o each have a substantially constant width.

However, the groove width may be varied like the secondary nonlinear groove 3h. Further, the phases of zigzag of the grooves 3o and 3i may be shifted slightly from each other in the tire circumferential direction, for example, by less than 10% of the pitch length Pa. Furthermore, at least one of the main nonlinear grooves 3i and 3o may have the groove side wall 5b having a different configuration from the that of the zigzag groove side wall 5a defining the rib 4.

Figure 5:
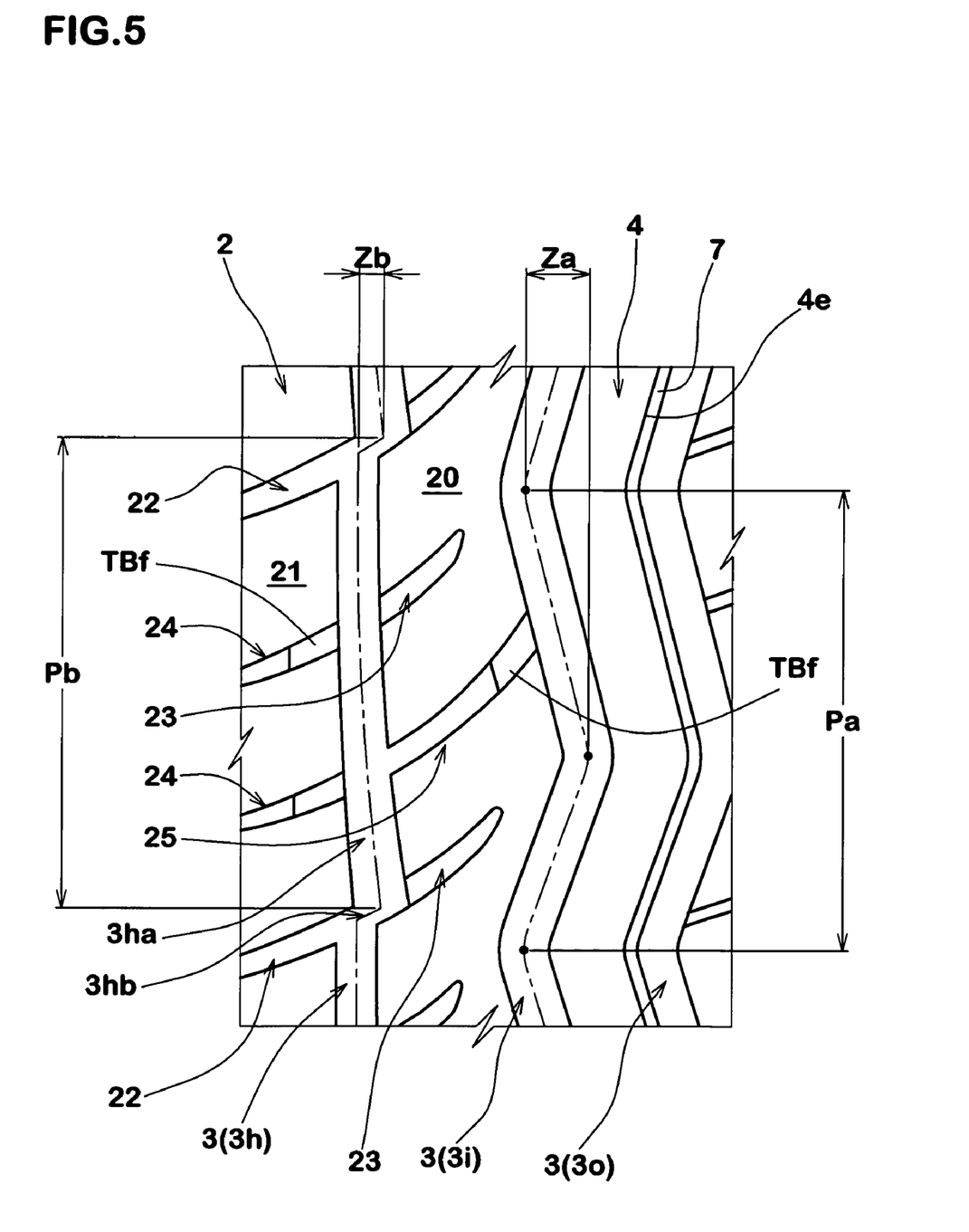
FIG. 5 is an enlarged view of a part Y of FIG. 1.

The inside secondary nonlinear circumferential groove 3h is, as shown in FIG. 5, composed of alternate first zigzag segments 3ha and second zigzag segments 3hb, wherein the first zigzag segment 3ha is such that the circumferential component is larger than the axial component, and the second zigzag segment 3hb is such that the axial component is larger than the circumferential component.

The circumferential length of the first zigzag segments 3ha is in a range of not less than 80%, preferably 80 to 95% of the circumferential length Pb of the zigzag pitch of the groove 3h. In comparison with the inside and outside nonlinear grooves 3i and 3o, the inside secondary nonlinear groove 3h is formed with a smaller zigzag amplitude Zb and/or a larger circumferential pitch lengths Pb.

Therefore, the groove 3h is more linear than the groove 3i, 3o, and the resistance to water flow is decreased. The rigidity of the tread portion on the axially inside of the rib 4 and drainage during straight running can be improved in a well-balanced manner.

In this embodiment, except for these three zigzag grooves 3o, 3i and 3h, the tread portion 2 is provided with no groove extending continuously in the tire circumferential direction.

However, lateral grooves are provided in the tread portion 2.

on the axially outside of the rib 4, main lateral grooves 9 and secondary lateral grooves 15 are disposed.

The main lateral groove 9 extends toward the axially outside from the outside nonlinear groove 3o beyond the outside tread edge Eo.

The center line of the outside main lateral groove 9 is inclined at an inclination angle of not more than 40 degrees, preferably less than 30 degrees with respect to the tire axial direction. If the inclination angle is more than 40 degrees, the portions divided by the grooves 9 are decreased in the rigidity, and the steering stability during cornering and uneven wear resistance are liable to deteriorate.

In this embodiment, the inclination angle is almost zero at the outside tread edge Eo, and gradually increased toward the inside so that, at the junction (j) with the groove 3o, the inclination angle becomes less than 15 degrees, and the intersecting angle therebetween becomes more than 90 degrees, but less than 160 degrees.

Figure 4:
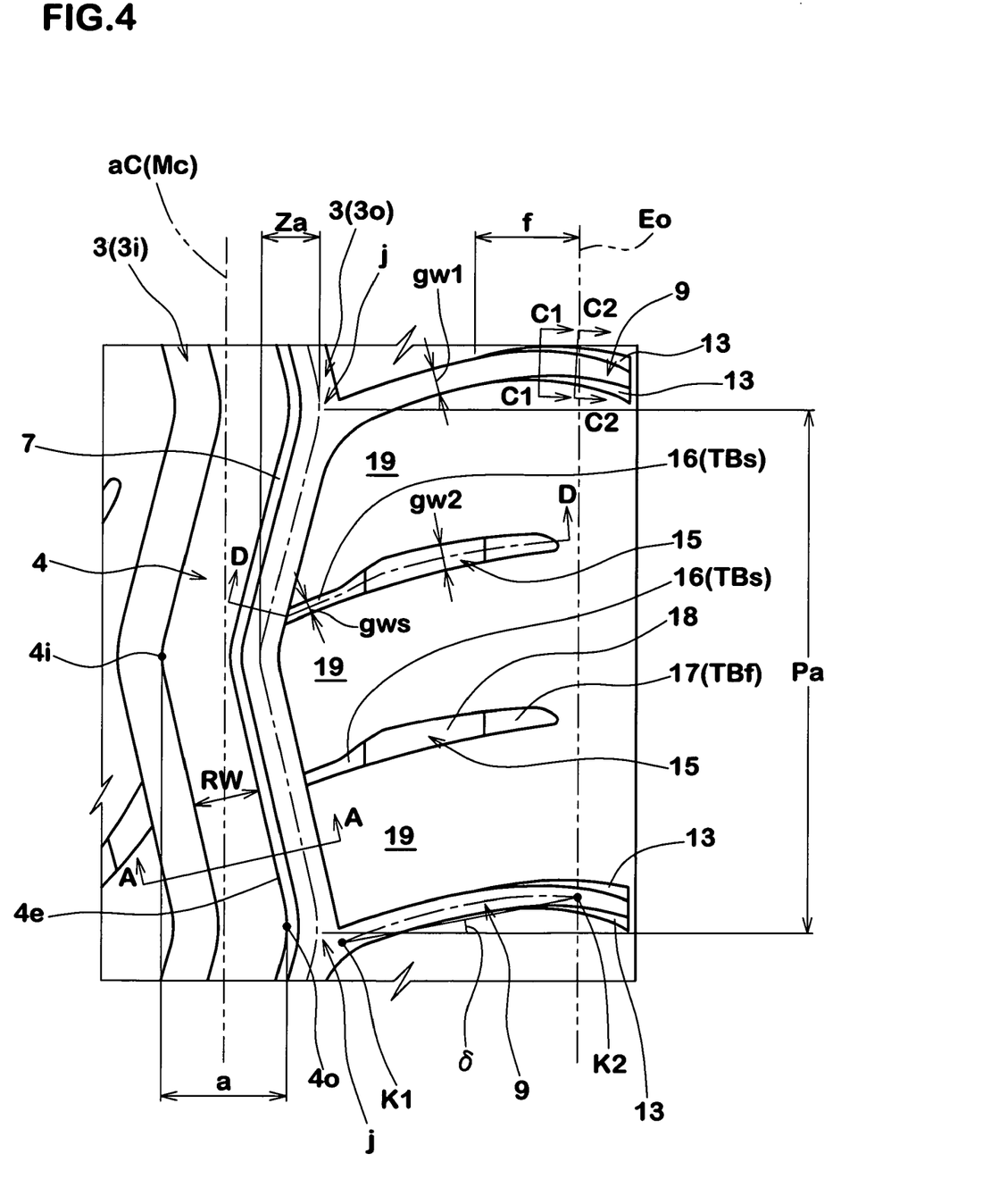
FIG. 4 is an enlarged view of a part X of FIG. 1.

Further, as shown in FIG. 4, the inclination angle (delta) of a straight line drawn between the ends K1 and K2 of the groove center line at the junction (j) and tread edge Eo, respectively, is set in a range of from 0 to 40 degrees, more preferably 0 to 30 degrees with respect to the tire axial direction.

In order to provide sufficient drainage and not to deteriorate steering stability, the groove width gw1 at the groove top is set in a range of not less than 2%, preferably more than 3%, but not more than 6%, preferably less than 5% of the tread width TW, and the groove depth gd1 is preferably set in a range of not less than 3 mm, but not more than 6 mm. In this example, each of the main lateral grooves 9 has a substantially constant groove width gw1, but it may be also possible that each groove 9 has a variable width gw1.

As shown in FIG. 4, the main lateral grooves 9 start from the vicinities (j) of the zigzag peaks 40 to reduce the resistance to water flow from the circumferential groove 3o to the main lateral grooves 9. Accordingly, the main lateral grooves 9 are arranged in the tire circumferential direction at the same circumferential pitches as the zigzag pitches Pa of the groove 3o. Further, to facilitate such water flow, corners between the main lateral grooves 9 and zigzag segments of the circumferential groove 3o which are inclined to the same direction as the main lateral grooves 9 (in FIG. 4, inclined towards the right-hand side) with respect to the tire circumferential direction, are rounded.

The secondary lateral groove 15 extends from the outside nonlinear groove 3o towards the outside tread edge Eo, but terminates before the outside tread edge Eo.

At least one secondary lateral groove 15 is disposed between any two adjacent main lateral grooves 9 to circumferentially subdivide each portion between the outside main lateral grooves 9 and 9 into substantially equal parts 19.

In this embodiment two secondary lateral grooves 15 are disposed between any two adjacent main lateral grooves 9. The secondary lateral grooves 15 are almost parallel with the main lateral grooves 9, and the secondary lateral grooves 15 subdivide each portion between the outside main lateral grooves 9 and 9 into substantially equal three parts 19.

On the axially inside of the rib 4, main lateral grooves 22, 24, 25 and secondary lateral grooves 23 are disposed to increase drainage and heat radiation and to optimize the rigidity of this inside part.

The main lateral grooves 22 and 24 are disposed between the secondary nonlinear circumferential groove 3h and inside tread edge Ei. The lateral grooves 23 and 25 are disposed between the nonlinear circumferential grooves 3h and 3i.

The main lateral grooves 22 and 24 extend from the nonlinear groove 3h towards the axially inside beyond the inside tread edge Ei.

In this example, the lateral grooves 22 start from the axially inside ends of the second zigzag segments 3hb of the nonlinear groove 3h, and two lateral grooves 24 are extended from each of the first zigzag segments 3ha.

The main lateral grooves 25 extend from the nonlinear groove 3h to the nonlinear groove 3i such that one groove is extended from each of the first zigzag segments 3ha.

The secondary lateral grooves 23 extend toward the axially outside to terminate before the inside main nonlinear groove 3i, wherein one groove starts from each of the first zigzag segments 3ha and another one groove starts from the axially outside end of each of the second zigzag segments 3hb.

Therefore, a portion between the inside main nonlinear groove 3i and the inside secondary nonlinear groove 3h is circumferentially divided by the lateral grooves 25 into blocks 20, and a portion between the inside secondary nonlinear groove 3h and the inside tread edge Ei is, divided by the lateral grooves 22 and 24 into blocks 21.

By providing the tread grooves as above, the land ratio of one half of the tread on the outside tread edge Eo side of the tire equator C (outside land ratio) is preferably set to be more than the land ratio of the other half on the inside tread Ei side of the tire equator C (inside land ratio).

Here, the land ratio is a ratio of the land area to the overall area including the land area and the sea area (grooved area).

Preferably, the land ratio of the entire tread portion (overall land ratio) is set in a range of from 70 to 75%, and the outside land ratio is set in a range of from 51 to 55% of the overall land ratio.

In FIG. 2, the tread profile TL under the normally inflated unloaded condition of the tire is shown.

The tread profile TL comprises a pair of shoulder parts including the tread edge Ei, Eo and having a smaller radius Rs of curvature, and a central part therebetween having a single radius Rp or multiradius of curvature which is three or more times larger than the radius Rs. Preferably, the radius Rs is set in a range of from 20 to 35 mm.

The curvature Rp of the central part is determined so as to satisfy the following condition for the tread camber D and so that the central part smoothly merges into the shoulder parts.

The tread camber D, which is the radial distance between the tire equator C and the tread edge Eo(Ei) measured in the normally inflated unloaded condition, is set in a range of from 0.04 to 0.06 times the tread width TW. Such a tread camber D is relatively large and thus the radius Rp is relatively small. AS a result, the maximum circumferential length CML becomes larger at the time of straight running as well as cornering, and the difference in the length CML between straight running and cornering becomes smaller. Therefore, the improvement in the traction by the nonlinear rib 4 can be facilitated, and abrupt change in the maneuverability from straight running to cornering and vice versa can be reduced to improve the steering stability.

Figure 6:
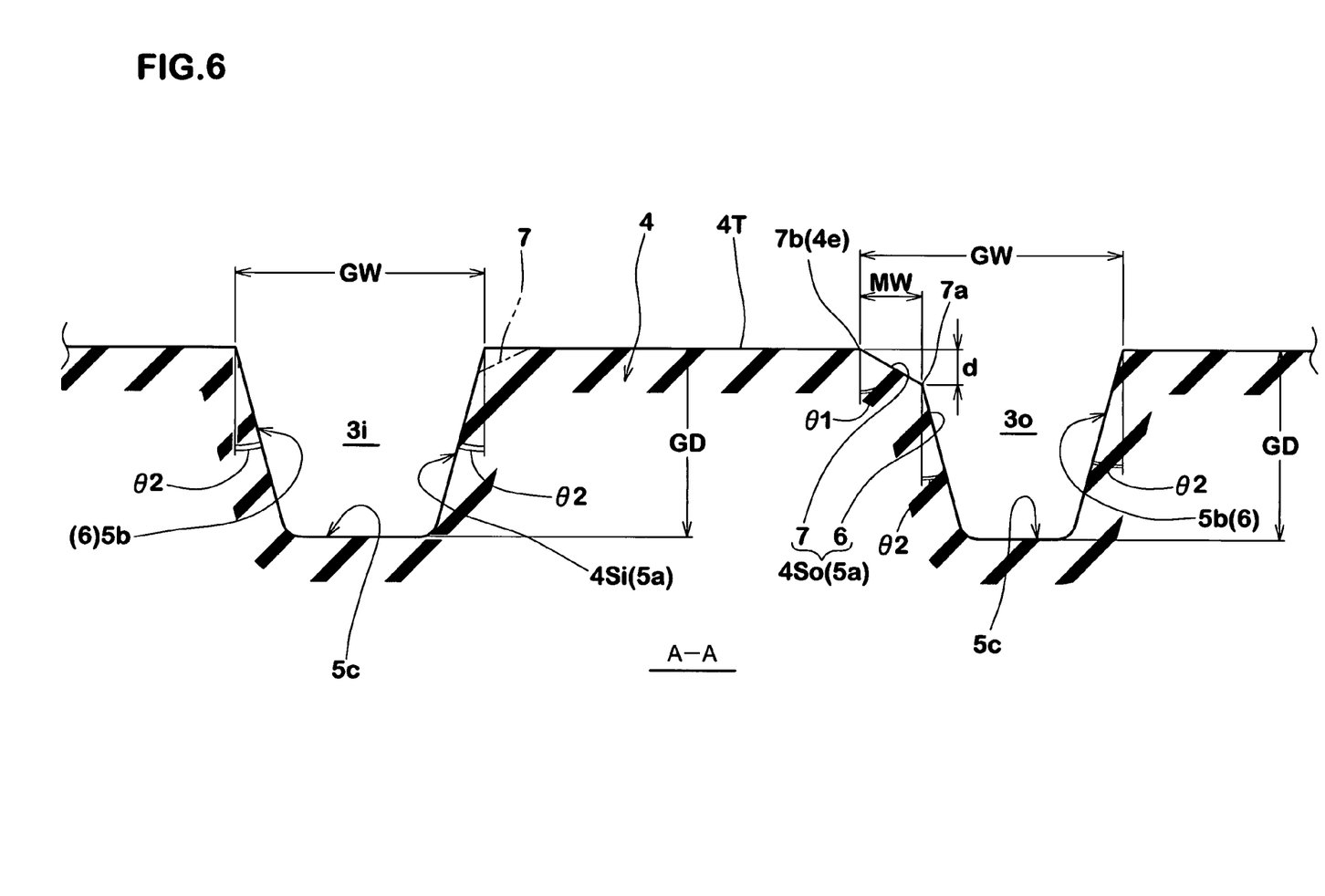
FIG. 6 is a cross sectional view taken along line A-A in FIG. 4.

According to the present invention, the axially outside edge of the rib 4 is chamfered. Therefore, as shown in FIG. 6, the side wall 4So of the rib 4, namely, the axially inside wall 5a of the outside nonlinear groove 3o comprises the radially outermost chamfered part 7 and a radially inner main part 6. In the cross section perpendicular to the longitudinal direction, the chamfered part 7 is inclined at a larger angle (theta1) of from about 65 to 85 degrees with respect to the normal direction to the tread surface such that the groove width decreases towards the groove bottom 5c.

The main part 6 is also inclined towards the same direction as the chamfered part 7 but at a smaller angle (theta2) of from about 5 to 35 degrees.

Therefore, an obtuse-angled corner is formed at the junction 7a of the chamfered part 7 and the main part 6. Further, an obtuse-angled corner is formed at the junction 7b of the chamfered part 7 and the top face 4T of the rib 4.

In this example, the main part 6 and chamfered part 7 are straight. But, these parts 6 and 7 may be curved like an arc independently from each other.

The width MW of the chamfered part 7 measured in the tire axial direction is set in a range of not less than 1%, but not more than 4%, preferably not more than 2% of the tread width TW. The numeric value of the width MW is about 4 to 8 mm. The depth (d) of the chamfered part 7 from the tread surface is preferably set in a range of from 5% to 25% of the groove depth GD of the outside nonlinear groove 3o.

On the other hand, the axially inside edge of the rib 4 can be chamfered in the same manner as the axially outside edge as described above, but in this embodiment, not chamfered.

Therefore, as shown in FIG. 6, the side wall 4Si of the rib 4, namely, the axially outside wall 5a of the inside main nonlinear groove 3i comprises a single part 6 inclined at the smaller angle (theta2) of from about 5 to 35 degrees. The side wall 4Si in this example is straight.

When the axially inside edge of the rib 4 is chamfered, it is preferable that the chamfered part 7 is smaller in the width MW and depth (d) than that on the axially outside edge.

The other side wall 5b of the outside nonlinear groove 3o and the other side wall 5b of the inside main nonlinear groove 3i are inclined at the small angle (theta2) of from about 5 to 35 degrees towards such direction that the groove width is increased. These side walls 5b are also straight.

In this embodiment, a similar chamfered part 13 is also provided on the outside main lateral grooves 9 extending to the outside tread edge Eo. It is possible to form the chamfered part 13 along the entire length of the groove 9, but in this embodiment, the chamfered part 13 is formed in only the vicinity of the outside tread edge Eo.

Figure 7:
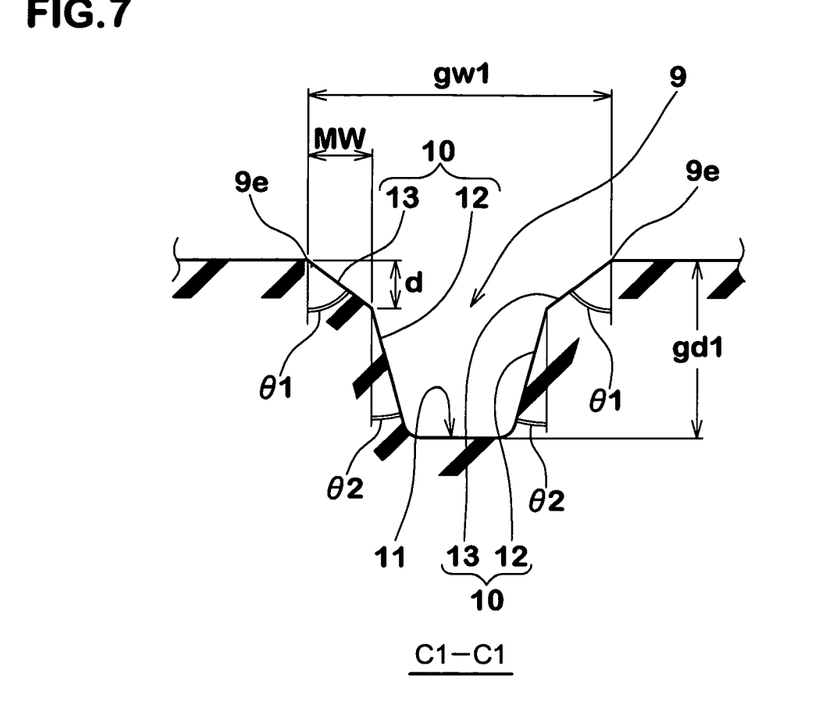
FIG. 7 is a cross sectional view taken along line C1-C1 in FIG. 4.
Figure 8:
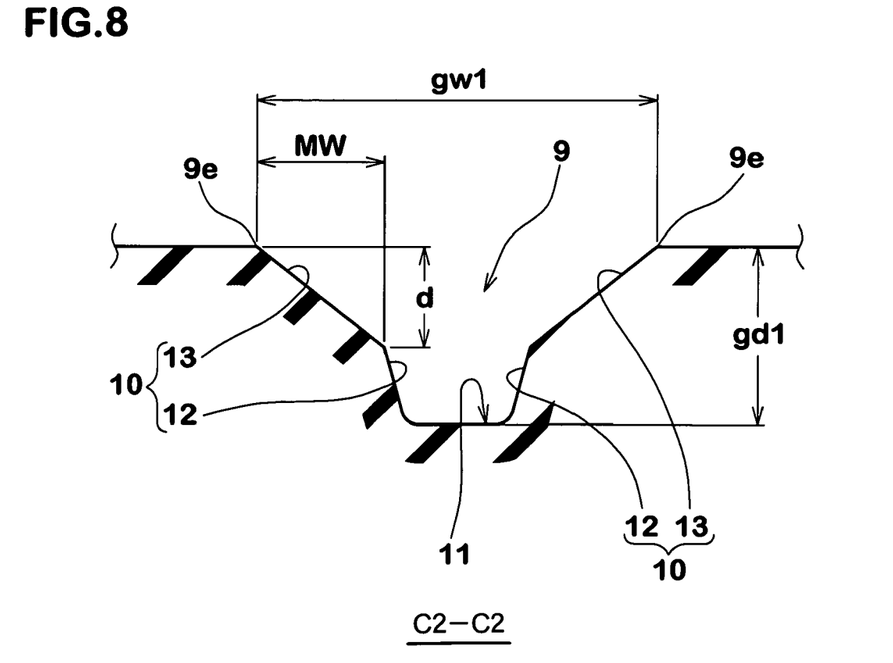
FIG. 8 is a cross sectional view taken along line C2-C2 in FIG. 4.

FIGS. 7 and 8 show the cross sectional views of such chamfered part of the outside main lateral grooves 9. As shown in FIGS. 7 and 8, each of the side walls 10 of the lateral groove 9 is provided with the chamfered part 13. The chamfered part 13 extends from the radially outermost end 9e of the wall 10 to a certain depth (d).

From the radially inner end of the chamfered part 13 at the depth (d), the main part 12 extends to the groove bottom 11.

In the cross section perpendicular to the groove centerline, the main part 12 inclines at a small angle (theta2) of about 5 to 35 degrees with respect to the normal direction to the tread face so that the groove width decreases towards the bottom 11.

The chamfered part 13 inclines at a larger inclination angle (theta1) of from about 65 to 85 degrees with respect to the normal direction to the tread face so that the groove width decreases towards the bottom 11.

In this example, the main part 12 and chamfered part 13 are straight, but these parts may be curved like an arc independently from each other.

To prevent stress concentration on the corner at which the chamfered part 13 meets the main part 12, the intersecting angle of the two parts 12 and 13 is preferably, set in a range of from 135 to 150 degrees. In this example, the difference (theta1)–(theta2) of the angle (theta1) from the angle (theta2) is preferably set in a range of from 30 to 45 degrees.

Such chamfered parts 13 are formed in at least a tread shoulder zone (f) near the outside tread edge Eo.

The tread shoulder zone (f) is defined as extending from the outside tread edge Eo toward the tire equator C for an axial distance of at least 5%, preferably at least 10%, but preferably not more than 20% of the tread width TW, and also toward the axially outside beyond the outside tread edge Eo preferably to the critical tread edge.

In this embodiment, further, the width MW and depth (d) of the chamfered part 13 gradually increases from its inside end to outside end so as to gradually increase the groove volume to thereby improving drainage and wet performance during cornering. The part out of the tread shoulder zone (f) is not provided with the chamfered part 13.

In the tread shoulder zone near the inside tread edge Ei, the chamfered part 13 is not provided on any lateral groove.

If the axially outside edge of the rib 4 is not provided with such chamfered part 7, as the edge is subjected to large stresses during cornering and chipped away rapidly and further tearing-off is liable to occur at the zigzag peaks.

Thus, the durability of the rib will be decreased rapidly during sporty driving especially high-speed cornering.

Likewise, if the main lateral grooves 9 are not provided with the chamfered parts 13 in the tread shoulder zone (f), as the groove edges are subjected to large stresses during cornering and chipped away rapidly and further tearing-off is liable to occur at the tread shoulder.

In this embodiment, some of the lateral grooves are provided with tie-bars TB.

The tie-bar TB extends from one of the opposite side walls of a groove to/to very near the other side wall so that the side walls support each other through the tie-bar to increase the stiffness or rigidity of the nearby region of the tread elements. Hereinafter, a tie-bar extending from one side wall to the other side wall is referred to as "full tie-bar TBf", and a tie-bar extending from one side wall to very near the other side wall is referred to as "semi-tie-bar TBs". In the semi-tie-bar TBs, the gap between the tie-bar and side wall is less than 1 mm, preferably about 0.5 mm.

The above-mentioned secondary lateral grooves 15 are each provided with a full tie-bar TBf and a semi-tie-bar TBs. The full tie-bar TBf is disposed in the axially outside end portion, and the semi-tie-bar TBs is disposed in the axially inside end portion of the groove 15.

The main lateral grooves 24 and 25 are each provided with a full tie-bar TBf in the axially outside end portion.

Incidentally, the above-mentioned semi-tie-bar TBs may be replaced by full tie-bar TBf. The full tie-bar TBf may be replaced by semi-tie-bar TBs.

Figure 9:
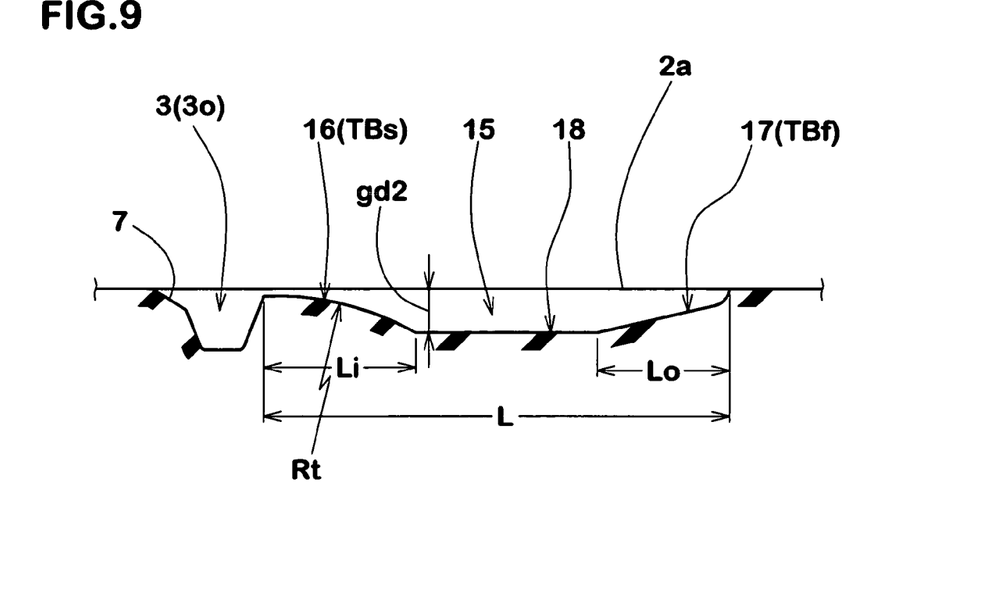
FIG. 9 is a cross sectional view taken along line D-D in FIG. 4.

In this embodiment, in order to prevent abrupt changes in tire characteristics due to tread rubber abrasion which occurs at accelerated pace during critical sporty running, unlike the conventional tie-bars having a flat top surface, the tie-bar TB (TBf, TBs) has an inclined top surface as shown in FIG. 9 to gradually increase the ground contacting area as the tread rubber wear progresses.

FIG. 9 shows a cross section taken along line D-D of FIG. 4. As shown in this figure, the top surface of the tie-bars TB (TBf and TBs) rise toward the adjacent groove ends respectively. This is also applied to the tie-bars TB (TBf) in the grooves 24 and 25, and the top surface rises toward the outside end.

Therefore, in the case of the outside secondary lateral groove 15, as shown in FIG. 9, due to the tie-bars TB, an axially inside reduced-depth part 16 and an axially outside reduced-depth part 17 are formed on both sides of a central part 18 having a depth gd2. The depth gd2 and width gw2 of the central part 18 are substantially same as the depth gd1 and width gw1 of the outside main lateral groove 9. In the reduced-depth parts 16 and 17, the depth gradually decreases from the central part 18 to the respective ends of the groove 15.

If the reduced-depth parts 16 and 17 are too large and accordingly the central part 18 is too small, then the drainage becomes insufficient. Therefore, their lengths Li and Lo measured along the groove center line are preferably set in a range of not more than 35%, more preferably less than 30% of the overall length L of the groove 15, but not less than 17%, more preferably more than 22% in view of the rigidity increasing effect.

The semi-tie-bar TBs (axially inside reduced-depth part 16) in the groove 15 and also the full tie-bars TBs (reduced-depth part) in the grooves 24 and 25 are curved convexly at a radius Rt so that the maximum rising height occurs at the junction with the circumferential groove 3.

On the other hand, the profile of the full tie-bar TBf (axially outside reduced-depth part 17) in the groove 15 is as shown in FIG. 9 straight or a slightly concave curve to maintain a sufficient drainage although it may be a slightly convex curve.

In addition to the provision of the tie-bar TBs, the axially inside end portion of the outside secondary lateral groove 15 is provided with a reduced-width portion to further increase the rigidity or stiffness of the axially inside edge portion of the parts 19 to provide improved traction.

As descried above, the outside part between the outside nonlinear groove 3o and outside tread edge Eo is divided by the main lateral grooves 9 into a plurality of circumferentially separated blocks. But, the secondary lateral grooves 15 do not extend completely across the blocks, and further the tie-bars TB are formed as explained above. Accordingly, each block between the main lateral grooves 9 functions as a large rigid block.

Therefore, cornering performance such as cornering grip and traction can be effectively improved, while maintaining good drainage performance.

Tests

Radial tires of size 225/45R17 (wheel rim size 7.5JJ-17) for passenger cars were made and tested for drainage performance, cornering performance and wear resistance as follows.

The tires had tread patterns similar to that shown in FIG. 1. The specifications thereof are shown in Table 1.

Drainage Performance Test

A Japanese 2000 CC 4WD passenger car provided on all the four wheels with test tires (tire pressure 220 kPa) was run along a 100 meter radius circle on a wet asphalt road provided with a 10 mm depth 20 m long water pool, and changing the running speed, the lateral acceleration (lateral G) was measured at the front wheels and the average of from 50 to 80 km/h was calculated. The results are indicated in Table 1 by an index based on Ref.1 being 100, wherein the larger the index number, the better the drainage performance.

Cornering Performance Test

Running the above test car on a test circuit course and a steering test course made up of a series of curves having various radii, the test driver evaluated cornering performance, e.g. cornering grip, critical cornering maneuverability and the like. The results are indicated in Table 1 by an index based on Ex.1 tire being 100, wherein the larger the index number, the better the cornering performance.

Wear Resistance Test

The test car was run on the test circuit course at critical cornering speed, and after running for a distance of 30 km, the rib was visually checked for damages such as tearing-off and uneven wear. The test results are shown in Table 1.

From the test results, it was confirmed that the drainage performance, cornering performance and wear resistance can be improved in a well balanced manner.

TABLE 1

| Tire | Ref. 1 | Ex. 1 | Ex. 2 | Ex. 3 | Ex. 4 | Ex. 5 | Ex. 6 | Ex. 7 |
|---|---|---|---|---|---|---|---|---|
| Tread width TW (mm) | 200 | 200 | 200 | 200 | 200 | 200 | 200 | 200 |
| Tread camber D/TW | 0.05 | 0.05 | 0.05 | 0.05 | 0.05 | 0.05 | 0.05 | 0.04 |
| Overall land ratio (%) | 72 | 72 | 72 | 72 | 72 | 72 | 72 | 72 |
| Outside land ratio (%) | 53 | 53 | 53 | 53 | 60 | 70 | 53 | 60 |
| Outside nonlinear groove 3o | | | | | | | | |
| Pitch Pa (mm) | 132 | 132 | 132 | 132 | 132 | 132 | 132 | 132 |
| Amplitude Za (mm) | 16 | 16 | 16 | 16 | 16 | 16 | 16 | 16 |
| Width GW (mm) | 10 | 13 | 13 | 13 | 13 | 13 | 13 | 13 |
| Depth GD (mm) | 6 | 6 | 6 | 6 | 6 | 6 | 6 | 6 |
| Angle theta2 (deg.) | 30 | 30 | 30 | 30 | 30 | 30 | 30 | 30 |
| Inside nonlinear groove 3i | | | | | | | | |
| Pitch Pa (mm) | 132 | 132 | 132 | 132 | 132 | 132 | 132 | 132 |
| Amplitude Za (mm) | 16 | 16 | 16 | 16 | 16 | 16 | 16 | 16 |
| Width GW (mm) | 12 | 12 | 12 | 12 | 12 | 12 | 12 | 12 |
| Depth GD (mm) | 6 | 6 | 6 | 6 | 6 | 6 | 6 | 6 |
| Angle theta2 (deg.) | 30 | 30 | 30 | 30 | 30 | 30 | 30 | 30 |
| Secondary nonlinear groove 3h | | | | | | | | |
| Pitch Pb (mm) | 132 | 132 | 132 | 132 | 132 | 132 | 132 | 132 |
| Amplitude Zb (mm) | 6 | 6 | 6 | 6 | 6 | 6 | 3 | 6 |
| Width GW (mm) | 12 | 12 | 12 | 12 | 12 | 12 | 6 | 6 |
| Depth GD (mm) | 6 | 6 | 6 | 6 | 6 | 6 | 6 | 6 |
| Rib | | | | | | | | |
| Width RW (mm) | 19 | 19 | 19 | 19 | 19 | 19 | 19 | 19 |
| Distance G from Edge Eo (mm) | 90 | 90 | 90 | 90 | 85 | 80 | 80 | 80 |
| Amplitude a (mm) | 36 | 36 | 36 | 36 | 36 | 36 | 36 | 36 |
| Chamfered part 7 | | | | | | | | |
| MW (mm)/d (mm) | 0/0 | 3/1.5 | 6/1.5 | 6/3 | 6/3 | 6/3 | 6/3 | 6/3 |
| offset *1 (mm) | 3.5 | 3.5 | 3.5 | 3.5 | 1.5 | 6.5 | 3.5 | 10 |
| Position MC *2 (mm) | 13.5 | 13.5 | 13.5 | 13.5 | 13.5 | 13.5 | 13.5 | 20 |
| Outside main lateral groove 9 | | | | | | | | |
| Width gw1 (mm) | 6.5 | 6.5 | 6.5 | 6.5 | 6.5 | 6.5 | 6.5 | 6.5 |
| Depth gd1 (mm) | 6 | 6 | 6 | 6 | 6 | 6 | 6 | 6 |
| Chamfer 13 | | | | | | | | |
| Width MW (max.) (mm) | 3 | 3 | 3 | 3 | 3 | 3 | 3 | 3 |
| Depth d (max.) (mm) | 3 | 3 | 3 | 3 | 3 | 3 | 3 | 3 |
| Zone width f (mm) | 20 | 20 | 20 | 20 | 20 | 20 | 20 | 20 |

TABLE 1-continued

| Tire | Ref. 1 | Ex. 1 | Ex. 2 | Ex. 3 | Ex. 4 | Ex. 5 | Ex. 6 | Ex. 7 |
|---|---|---|---|---|---|---|---|---|
| Outside secondary lateral groove 15 | | | | | | | | |
| Width gw2 (mm) | 6 | 6 | 6 | 6 | 6 | 6 | 6 | 6 |
| depth gd2 (mm) | 6 | 6 | 6 | 6 | 6 | 6 | 6 | 6 |
| Tie-bar TBs (part 16) Li/L | 0.25 to 0.3 | 0.25 to 0.3 | 0.25 to 0.3 | 0.25 to 0.3 | 0.25 to 0.3 | 0.25 to 0.3 | 0.25 to 0.3 | 0.25 to 0.3 |
| Tie-bar TBf (part 17) Lo/L | 0.3 | 0.3 | 0.3 | 0.3 | 0.3 | 0.3 | 0.3 | 0.3 |
| Drainage performance | 95 | 100 | 100 | 105 | 100 | 98 | 98 | 100 |
| Cornering performance | 90 | 100 | 95 | 90 | 95 | 90 | 105 | 90 |
| Wear resistance | 90 | 100 | 95 | 95 | 95 | 95 | 100 | 95 |

*1) axial distance between the center of the amplitude and position MC
*2) axial distance (r) between position MC and tire equator C

The invention claimed is:

1. A pneumatic tire comprising a tread portion provided with a nonlinear rib having an amplitude having a center in the tire axial direction, wherein
   in a normally loaded condition of the tire, the tread portion has an outside tread edge Eo and an inside tread edge Ei when the camber angle of the tire is 0 degrees,
   in said normally loaded condition, when a camber angle of 4 degrees is given to the tire to incline towards the outside tread edge Eo, a foot print shape of the tire has a maximum circumferential length at an axial position MC which is off the tire equator towards the outside tread edge Eo,
   said nonlinear rib is positioned off the tire equator towards the outside tread edge Eo such that said axial position MC lies within the amplitude of the nonlinear rib, and
   one of the edges of the nonlinear rib on the outside tread edge side is chamfered,
   wherein the tread portion is further provided with
   an outside nonlinear circumferential groove disposed on the outside tread edge side of said nonlinear rib adjacent to the nonlinear rib,
   outside main lateral grooves extending from the outside nonlinear circumferential groove to the outside tread edge Eo, wherein edges of each said outside main lateral grooves are chamfered, at least in the vicinity of the outside tread edge Eo, and
   outside secondary lateral grooves disposed between the outside main lateral grooves and extending from said outside nonlinear circumferential groove towards the outside tread edge Eo but terminates before the outside tread edge Eo, wherein the outside secondary lateral grooves are provided therein with tie-bars.

2. The pneumatic tire according to claim 1, wherein the axial distance of the center of the amplitude from the axial position MC is not more than 40% of the amplitude.

3. The pneumatic tire according to claim 1, wherein the axial distance of the center of the amplitude from the axial position MC is less than 5% of the amplitude.

4. The pneumatic tire according to claim 1, wherein
   the tread portion is further provided with an inside main nonlinear circumferential groove and an inside secondary nonlinear circumferential groove more linear than the inside main nonlinear circumferential groove,
   the inside main nonlinear circumferential groove disposed on the inside tread edge side of said nonlinear rib adjacently to the rib, and
   the inside secondary nonlinear circumferential groove disposed between said inside main nonlinear circumferential groove and said inside tread edge Ei.

5. The pneumatic tire according to claim 1, wherein
   in a normally inflated unloaded condition of the tire, a tread camber D measured at the outside tread edge is in a range of not less than 0.04 and not more than 0.06 times the tread width TW measured between the outside and inside tread edges.

* * * * *